United States Patent
Munson et al.

(10) Patent No.: US 9,032,374 B2
(45) Date of Patent: May 12, 2015

(54) METADATA-INTEGRATED DEBUGGER

(75) Inventors: Eric B. Munson, Hillsboro, OR (US);
Ramachandra N. Pai, Beaverton, OR (US); Timothy C. Pepper, Tigard, OR (US); Nathan V. Bak, Portland, OR (US); Gerrit Huizenga, Portland, OR (US); Patricia A. Gaughen, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 12/061,907

(22) Filed: Apr. 3, 2008

(65) Prior Publication Data
US 2009/0254883 A1 Oct. 8, 2009

(51) Int. Cl.
*G06F 9/44* (2006.01)
*G06F 11/36* (2006.01)

(52) U.S. Cl.
CPC ........ *G06F 11/3624* (2013.01); *G06F 11/3636* (2013.01)

(58) Field of Classification Search
USPC ........................................................ 717/130
See application file for complete search history.

(56) References Cited

U.S. PATENT DOCUMENTS

| | | | | |
|---|---|---|---|---|
| 6,077,312 | A * | 6/2000 | Bates et al. | 717/129 |
| 6,249,907 | B1 * | 6/2001 | Carter et al. | 717/129 |
| 6,587,995 | B1 * | 7/2003 | Duboc et al. | 716/106 |
| 6,738,968 | B1 | 5/2004 | Bosworth et al. | |
| 6,795,962 | B1 * | 9/2004 | Hanson | 717/129 |
| 6,836,884 | B1 * | 12/2004 | Evans et al. | 717/140 |
| 7,007,268 | B2 * | 2/2006 | Emberson | 717/127 |
| 7,130,863 | B2 | 10/2006 | Diab | |
| 7,134,115 | B2 * | 11/2006 | Kawai et al. | 717/124 |
| 7,178,135 | B2 * | 2/2007 | Bates et al. | 717/129 |
| 7,272,826 | B2 * | 9/2007 | Bates et al. | 717/129 |
| 7,360,204 | B2 * | 4/2008 | Bates et al. | 717/129 |
| 7,370,315 | B1 * | 5/2008 | Lovell et al. | 717/100 |
| 7,395,458 | B2 * | 7/2008 | Shrivastava et al. | 714/47.2 |
| 7,409,652 | B1 * | 8/2008 | Fox et al. | 716/106 |
| 7,603,659 | B2 * | 10/2009 | Blumenthal et al. | 717/128 |
| 7,805,717 | B1 * | 9/2010 | Spertus et al. | 717/158 |
| 7,818,721 | B2 * | 10/2010 | Sundararajan et al. | 717/130 |
| 8,032,864 | B2 * | 10/2011 | Pugh et al. | 717/125 |
| 8,095,916 | B2 * | 1/2012 | Bates et al. | 717/129 |
| 8,156,473 | B2 * | 4/2012 | Heidasch | 717/124 |
| 8,336,032 | B2 * | 12/2012 | Bates | 717/129 |
| 8,423,969 | B2 * | 4/2013 | Arnold et al. | 717/129 |
| 8,522,196 | B1 * | 8/2013 | Kim et al. | 717/105 |
| 2002/0104071 | A1 * | 8/2002 | Charisius et al. | 717/109 |
| 2002/0120918 | A1 * | 8/2002 | Aizenbud-Reshef et al. | 717/127 |
| 2002/0120919 | A1 * | 8/2002 | Aizenbud-Reshef et al. | 717/127 |
| 2003/0088854 | A1 * | 5/2003 | Wygodny et al. | 717/130 |
| 2003/0217354 | A1 * | 11/2003 | Bates et al. | 717/129 |
| 2004/0128655 | A1 * | 7/2004 | Bates et al. | 717/129 |
| 2004/0168155 | A1 * | 8/2004 | O'Farrell et al. | 717/129 |
| 2004/0205728 | A1 * | 10/2004 | Hanson | 717/129 |

(Continued)

*Primary Examiner* — Matthew Brophy
(74) *Attorney, Agent, or Firm* — Walter W. Duft (57) ABSTRACT

A method, system and computer program product for software debugging using annotation metadata. A set of metadata comprising source code annotation information for a software program is maintained, together with data/metadata relationships between individual units of the metadata and individual units of the source code. A software debugging point is set that is associated with debugging point metadata comprising one or more units the metadata. A debugging action is performed when execution of the software program reaches said debugging point.

22 Claims, 9 Drawing Sheets

(56) References Cited

U.S. PATENT DOCUMENTS

| | | | |
|---|---|---|---|
| 2004/0226003 A1* | 11/2004 | Bates et al. | 717/129 |
| 2005/0034104 A1 | 2/2005 | Pugh et al. | |
| 2005/0044536 A1 | 2/2005 | Kwong et al. | |
| 2005/0108686 A1* | 5/2005 | White | 717/124 |
| 2005/0155021 A1* | 7/2005 | DeWitt et al. | 717/130 |
| 2005/0216893 A1 | 9/2005 | Horton et al. | |
| 2005/0273490 A1* | 12/2005 | Shrivastava et al. | 709/203 |
| 2005/0273667 A1 | 12/2005 | Shrivastava et al. | |
| 2005/0278585 A1 | 12/2005 | Spencer | |
| 2006/0123395 A1 | 6/2006 | Andrews et al. | |
| 2006/0271917 A1* | 11/2006 | Das et al. | 717/130 |
| 2007/0067372 A1 | 3/2007 | Meijer | |
| 2007/0079257 A1 | 4/2007 | Vignet | |
| 2007/0220079 A1* | 9/2007 | Chandrasekharan et al. | 709/202 |
| 2008/0034351 A1* | 2/2008 | Pugh et al. | 717/128 |
| 2008/0046866 A1* | 2/2008 | Bates et al. | 717/129 |
| 2008/0127119 A1* | 5/2008 | Kasman | 717/130 |
| 2008/0134149 A1* | 6/2008 | Bates et al. | 717/129 |
| 2008/0163179 A1* | 7/2008 | Arnold et al. | 717/129 |

* cited by examiner

```
                foo.c 1    lock_t l;
2
3    int main(void) {
4
5    lock(&l);
6    do_something();
7    unlock(&l);
8    }
```
~72

*FIG. 6*

```
                bar.c

.
.
.

13   lock(&l);
14   do_something_else();
15   unlock(&l);
.
.
.
```
~74

METADATA-INTEGRATED DEBUGGER

BACKGROUND OF THE INVENTION

1. Field of the Invention

The present invention is directed to the annotation of source code to facilitate source code comprehension, particularly for software development. More particularly, the invention concerns the use of annotation information for source code debugging.

2. Description of the Prior Art

By way of background, conventional software debugging tools allow a user to monitor program execution, check interrupt and exception handling, inspect data values, and perform other tasks that allow software operation to be checked and verified. Using such tools requires intimate knowledge of the source code, including the executable file structure and the function and method names for the program. This is because debugging typically involves halting program execution by setting breakpoints at selected instructions or by setting watchpoints that trigger breakpoints when specified memory addresses are accessed or reach certain values or when subroutines or other sections of code are executed. Thus, when a developer is required to debug unfamiliar source code, he/she is faced with the need to understand what may be a large and complex code base. Existing annotation tools are available that describe functions, methods, or code blocks using source code comments, state diagrams, flow charts, call graphs, control flow graphs, pseudo code, and/or a description of what a specified code block accomplishes. However, even if extensive annotation is available, the developer must ultimately wade into the code in order to perform debugging tasks such as setting break points, watch points, etc. so that the desired portion(s) of the software may be observed during execution.

It is to improvements in the art of software debugging that the present invention is directed. In particular, a technique is described wherein software metadata resources can be leveraged to directly support the debugging effort.

SUMMARY OF THE INVENTION

The foregoing problems are solved and an advance in the art is obtained by a method, system and computer program product for software debugging using annotation metadata. According to the disclosed technique, a set of metadata comprising source code annotation information for a software program is maintained, together with data/metadata relationships between individual units of the metadata and individual units of the source code. A software debugging point is set that is associated with debugging point metadata comprising one or more units the metadata. A debugging action is performed when execution of the software program reaches said debugging point.

According to exemplary disclosed embodiments, the data/metadata relationships may include statically defined data/metadata relationships and/or dynamically defined data/metadata relationships based on regular expressions or other pattern matching criteria. The debugging action may include executing all software instructions having a data/metadata relationship with the debugging metadata, and displaying a debugging output. The software instructions could also represent one or more units of the source code having a data/metadata relationship with metadata that has a metadata/metadata relationship with the debugging metadata. If desired, the metadata may be displayed and the debugging point may be set in response to user selection of the debugging metadata. The metadata may be displayed in any desired manner, including hierarchically. The source code having a data/metadata relationship with the debugging metadata may also be displayed, and the debugging point could be set in response to user selection of the source code.

BRIEF DESCRIPTION OF THE DRAWINGS

The foregoing and other features and advantages of the invention will be apparent from the following more particular description of exemplary embodiments, as illustrated in the accompanying Drawings, in which.

DETAILED DESCRIPTION OF EXEMPLARY EMBODIMENTS

Introduction

As described hereinafter by way of exemplary embodiments, an improved technique is provided for integrating source code annotation information (metadata) into a debugging tool. According to the disclosed technique, debugging of a software program may be performed using available metadata without interacting with the program's source code. The metadata may define groups or classes of instructions of the software program and the debugging tool can allow a developer to interact with the software by directing program execution based on these groups/classes. In this way, the developer need not be familiar with the intricacies of the underlying source code. The debugger may initiate debugging operations by accessing a metadata database and presenting a view of the metadata to the developer. When the developer identifies a metadata location where debugging is to be performed, the debugger determines the corresponding debugging target(s) in the underlying source code and inserts the required debugging code (e.g., a breakpoint, a watchpoint, etc.). To assist the developer identify the debugging location, the debugger may optionally present a view of the source code corresponding to the metadata category being presented. The debugger then allows the developer to step through program execution while remaining in metadata context, using defined metadata groupings or hierarchies as stopping points instead of just the next line of source code. The developer may then be allowed to inspect changes in the program execution environment (e.g., data values) and thereafter increment ("next") over the next instruction or a collection of instructions associated with a metadata category.

Exemplary Embodiments

Figure 1:
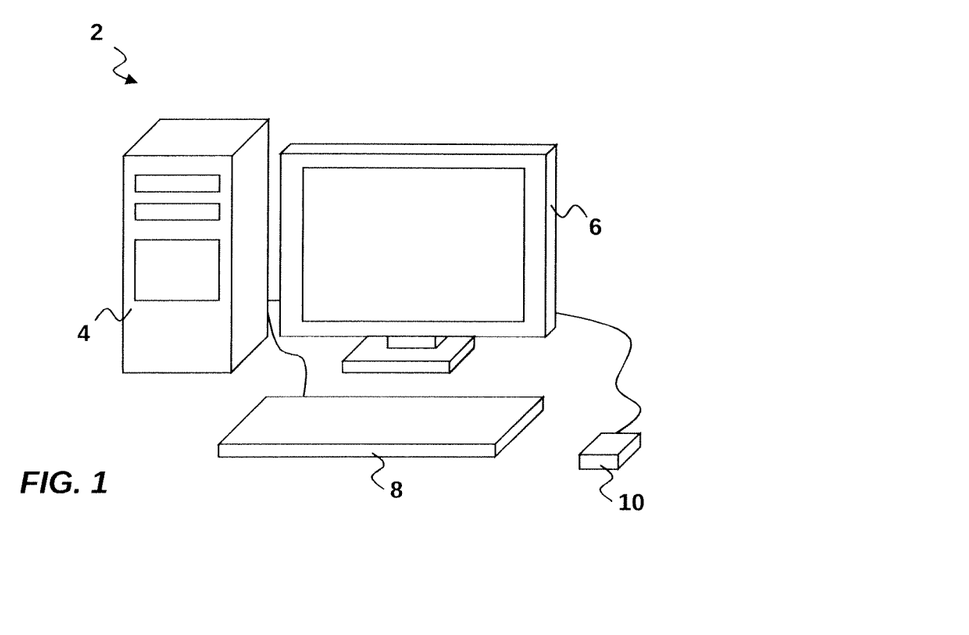
FIG. 1 is a diagrammatic illustration showing an exemplary data processing system that may be used to implement software debugging using annotation metadata.

Turning now to drawing figures, wherein like reference numerals indicate like elements in all of the several views, FIG. 1 illustrates an exemplary data processing system 2 that may be implemented to support metadata-integrated debugging in accordance with the present disclosure. The system 2 includes an enclosure 4 containing system data processing components (see FIG. 2), a video display monitor 6 capable of generating an output of text and graphics images, a keyboard input device 8, and a mouse input device 10. The system 2 may be implemented using any of a variety of existing computers and other data processing systems and devices, including but not limited to mainframe and midrange computers, work stations, desktop computers, laptop computers, and handheld or portable devices such as personal digital assistants, mobile telephones, etc. The system 2 may be a standalone system or it may interact with external devices that communicate with the system 2, such as other computing nodes in multi-node network, including a cluster or other scaled architecture.

Figure 2:
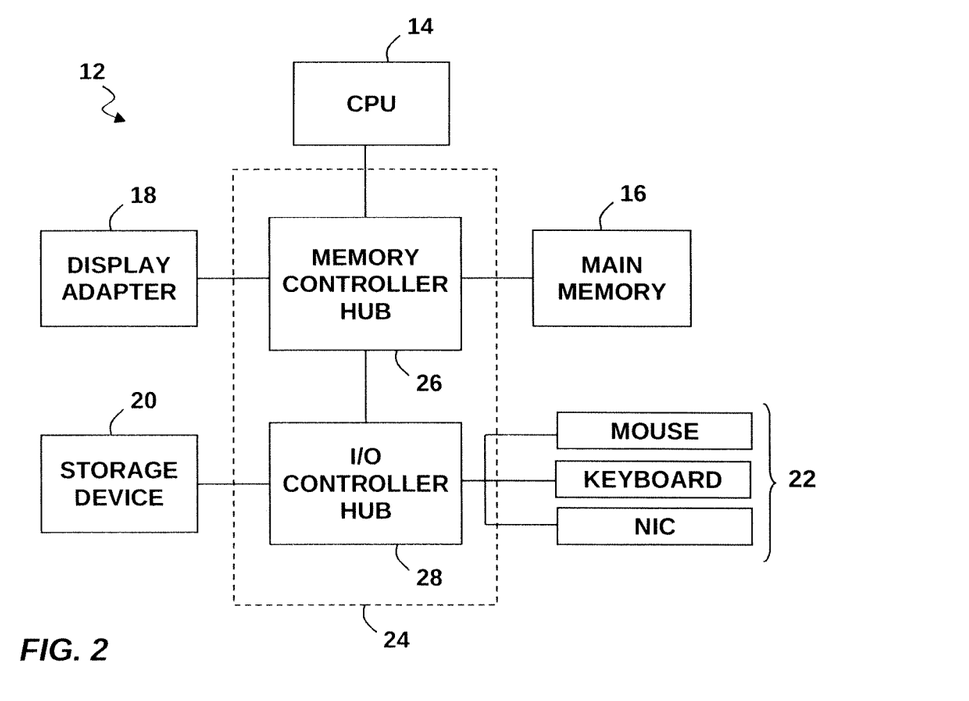
FIG. 2 is a functional block diagram showing exemplary data processing hardware components that may be used to implement the system of FIG. 1.

FIG. 2 illustrates exemplary hardware components 12 that may be contained within the enclosure 4 and used to implement the system 2 of FIG. 1. The components 12 may include one or more CPUs or other logic-implementing hardware 14 that operates in conjunction with a main memory 16 to provide a data processing core. Additional components may include a display adapter (e.g., graphics card) 18 for generating visual output information to the display device 6 (graphics or text), a peripheral storage device 20, and various peripheral devices 22 that may include the keyboard 8 and the mouse 10 of FIG. 1. The peripheral devices 22 may also include other I/O resources, such as a network interface card (NIC), a USB bus controller (not shown), a SCSI disk controller (not shown), etc. A bus infrastructure 24 that may include a memory controller hub 26 and an I/O (input/output) controller hub 28 may be used to interconnect the foregoing elements. It should be understood that the components 12 are exemplary in nature and that other component arrangements may also be used to implement the system 2.

Figure 3:
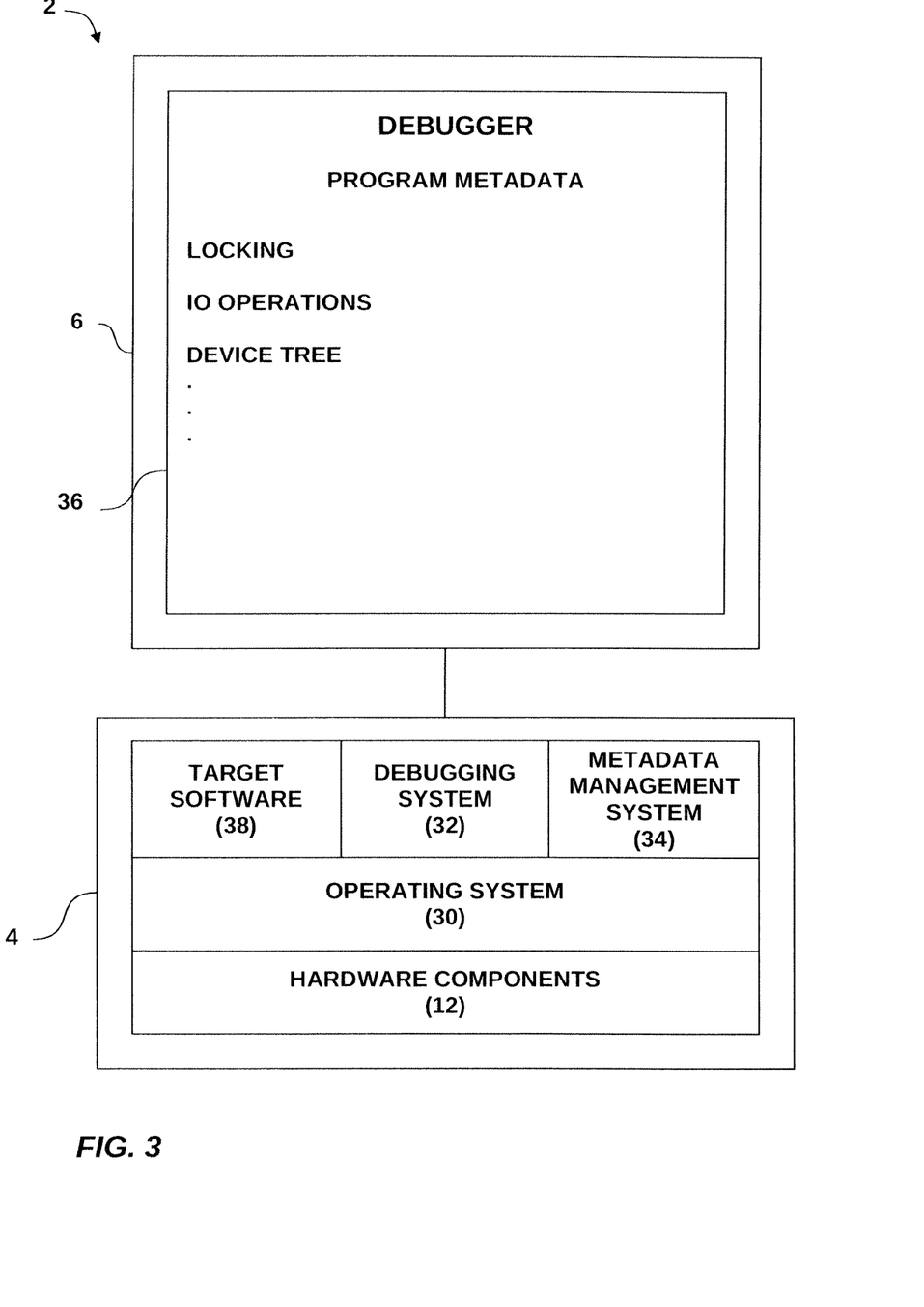
FIG. 3 is a functional block diagram showing exemplary logic of the system of FIG. 1.

Turning now to FIG. 3, various logic components for controlling the system 2 are shown. Reference numeral 30 represents an operating system that may be provided by any conventional operating system program capable of controlling the underlying hardware, including but not limited to a general purpose operating system, an embedded operating system, a guest operating system running in a virtual machine, a virtual machine manager, a hypervisor, etc. If desired, the operating system 30 may support the generation of a graphical user interface on the display device 6. However, this is not a requirement insofar as metadata-integrated debugging may be implemented in either a graphical (e.g. windowed) environment or a text-only environment (e.g., using text-based grouping commands). Reference numeral 32 represents program logic (software, firmware, hardware or a combination thereof) that provides a metadata-integrated debugging system as disclosed herein. Reference numeral 34 represents program logic (software, firmware, hardware or a combination thereof) that provides a metadata management system and maintains metadata used by the debugging system 32. Although the debugging system 32 and the metadata management system 34 are shown as application programs that run above the operating system 30, it will be appreciated that some or all of the logic implemented by these programs could be implemented as operating system functions. It should also be noted that although the debugging system 32 and the metadata management system 34 are shown as being part of the system 2, one of the systems 32 or 34 could be external to the system 2, such as on a network node that communicates with the system 2. Moreover, the debugging system 32 and the metadata management system 34 need not be discrete applications. Thus, the debugging system 32 could be integrated into metadata management system 34, and visa versa.

The debugging system 32 presents a user interface (UI) 36 on the display device 6 (or on a remote display) that allows a developer to interact with metadata associated with a target software program 38 to be debugged. The user interface 36 (which can be graphical or text-based) displays a menu of metadata topics that a developer may select for debugging. In FIG. 3, three exemplary metadata topics, "Locking" and "IO Operations," and "Device Tree," are presented. These metadata topics represent metadata objects maintained by the metadata management system 34 in association with the source code of the target software 38. As described in more detail below, metadata may be associated with any desired aspect of the target software 38, including but not limited to, ranges of code by line number, line number range, etc., and patterns based on portions of lines (e.g., tokens), regular expressions, fuzzy pattern matches based on a variety of fuzzy pattern matching algorithms, etc. Conversely, designated portions of the target software 38 will thus be associated with defined metadata categories and hierarchies. It is possible for a source code instruction to belong to zero or many metadata groups and hierarchies. The metadata is maintained by the metadata management system 34 in an appropriate format (e.g., a database) that can be accessed by the debugging system 32 in order to generate the user interface 36.

Figure 4:
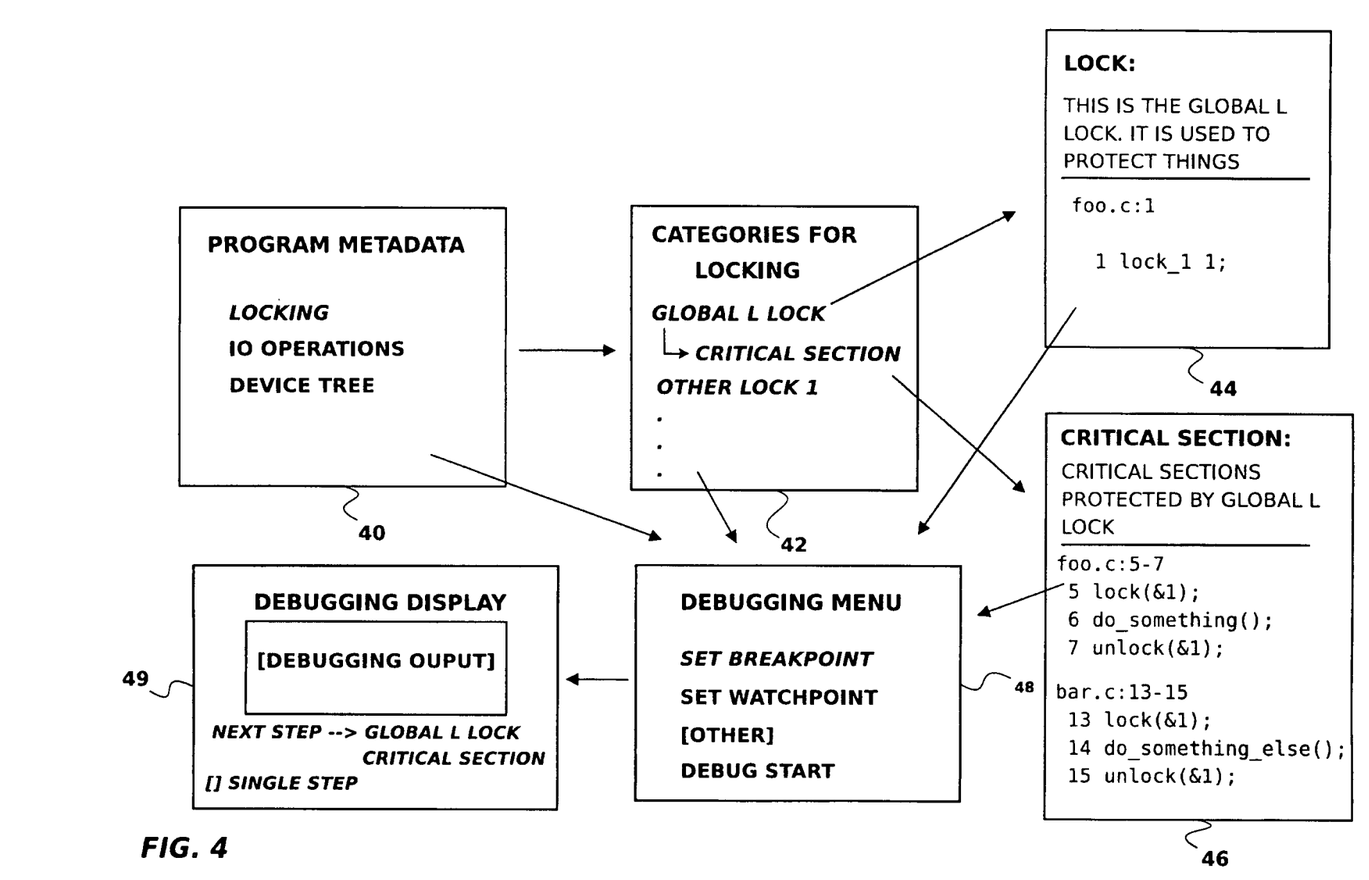
FIG. 4 is a diagrammatic representation of a set of exemplary graphical display windows showing a metadata hierarchy that may be used for software debugging using annotation metadata.

As additionally shown in FIG. 4, the metadata topics may be presented in the user interface 36 as a menu tree comprising a series of hierarchical debugging menus, such as the menus 40-46. These menus allow a developer to set debugging points based on source code groups and hierarchies having defined data/metadata relationships with the metadata menu items. In this way, a developer may start the debugging system 32 and select a desired level of the metadata hierarchy at which the developer feels comfortable. This metadata level can be high enough so that the developer is not buried in details he/she does not understand yet low enough to provide a "feel" for the code path and an understanding of the software functions/methods and their behavior.

A main menu 40 in FIG. 4 represents the top-level debugging menu shown in FIG. 3 in which broad metadata topics (representing different categories of target software operation) are presented. By selecting one of the metadata topics using an appropriate user interface action (e.g., a left mouse button click), a debugging point (e.g., a breakpoint or watchpoint) could be set on all program code sections associated with the metadata topic. For example, assume that a developer wishes to obtain an understanding of the locking subsystem of the target software 38. By left clicking on the "Locking" metadata topic in the menu 40, the developer could debug all locking operations of the target software 38. This debugging selection could be assisted by way of an additional menu 48 that allows standard debugging options to be selected (e.g., set breakpoint, set watchpoint, etc.) relative to the selected metadata topic. In this way, a debugging operation would be performed each time the locking subsystem is invoked. By using a different user interface action (e.g., a right mouse button click), a submenu could be generated that presents one or more metadata subtopics associated with the selected main menu topic. The metadata topics and subtopics have defined metadata/metadata relationships. For example, by right clicking the "Locking" metadata topic in the menu 40, the submenu 42 could be generated to display individual locks of the target software 38.

As with the main menu 40, an appropriate submenu user interface action will either allow a debugging action to be specified with respect to the selected metadata topic, or a further metadata menu operation could be performed. In submenu 42, a lock named "Global L Lock" is identified. A left mouse button click on this submenu topic may be used to invoke the debugging menu 48, thereby allowing a developer to select a debugging option (e.g., set breakpoint, set watchpoint, etc.) that will result in a debugging operation being performed each time the "Global L Lock" is invoked. The submenu 42 also displays a "Critical Section" submenu topic that is shown by way of the L-shaped arrow to be related to the "Global L Lock." In particular, the "Critical Section" metadata subtopic represents the critical section that is protected by the "Global L Lock." A defined metadata/metadata relationship exists between these metadata items. By performing an appropriate user input action (e.g., a left mouse button click), the developer can invoke the debugging menu 48 and set an additional debugging point on the "Critical Section" code. During debugging, this allows the developer to step through the code protected by the "Global L Lock" to inspect the state of the target software 38 during critical section processing.

A right mouse button click on the "Global L Lock" menu topic may be used to generate a further submenu 44 that displays the source code for the Global L Lock, and which may also contain metadata information about this lock. The menu 44 may also provide the option of setting a debugging point using the source code itself. Thus, performing an appropriate user interface action (e.g., a left mouse button click) in the submenu 44 could result in the debugging menu 48 again being displayed. This option would allow a debugging option (e.g., set breakpoint, set watchpoint, etc.) to be specified at a designated source code line number. It should be noted that a source code menu, such as the menu 44, could be made accessible from the main menu 40 if desired. In that case, performing an appropriate user interface action with respect to the "Locking" metadata topic could generate the source code menu 44 with all of the locking source code for the target software 38 being displayed.

The menu 46 is another source code menu that displays the source code and associated metadata for critical sections protected by the "Global L Lock." This menu can be accessed by performing an appropriate user interface action on the metadata subtopic labeled "Critical Section" in the submenu 42. Like the menu 44, the menu 46 can be used to invoke the debugging menu 48 and set debugging points in the source code itself.

Once a debugging point is set using the menu tree of FIG. 4, the target software 38 may be run so that debugging can be performed by the debugging system 32. A "Debug Start" command may be provided in the debugging menu 48 for this purpose. The debugging system 32 may generate a debugging display 49 that displays the results of the debugging operation, such as the values of processor registers, memory locations, etc. Advantageously, the target software 38 can be interrupted by the debugging system 32 in accordance with the manner in which the debugging point was set. If the debugging point was set based on a metadata topic or subtopic, the target software can be stopped at the beginning of the set of instructions that correspond to the metadata item used to set the debugging point. For example, if the developer used the "Global L Lock" metadata subtopic of submenu 42 to set the debugging point, the debugging system 32 can execute the target software 38 until the lock code that implements the "Global L Lock" is reached, then stop and advise the developer that the "Global L Lock" has been reached via a suitable message in the debugging display 49. The debugging display 49 also includes a menu selection that allows the developer to perform a "next step" operation that steps through a user-specified set of target software instructions while generating debugging output information. The developer may be presented with several options for stepping through the metadata topic used to set the debugging point. For example, if a debugging point corresponding to the "Global L Lock" has been reached, the developer may be presented with the menu option ("Next Step → Global L Lock"). This option causes the debugging system 32 to step through the code representing "Global L Lock," at which point the target software will again halt and debugging output will be presented in the debugging display 49. Advantageously, the developer may also be presented with the option of stepping through code associated with metadata having a metadata/metadata relationship with the metadata used to set the debugging point. For example, an additional menu option ("Next Step → Critical Section") could be presented so that the developer could opt to have the debugger 32 step through the critical section code associated with the "Critical Section" metadata subtopic in order to observe critical section execution, inspect changed memory values, etc. Note that the stepping could be set to step over the entire set of code corresponding to the metadata topic or subtopic, thus presenting a macro view of such code. Alternatively, the developer could be presented with the option ("Single Step") of single stepping through the code one line at a time. Note that the "Next Step →" menu selections of the debugging display 49 will vary dynamically according to the context in which debugging is performed. It will be appreciated that the "Global L Lock" and "Critical Section" stepping options are context specific to the "Global L Lock" metadata subtopic. Different "Next Step →" menu selections would be automatically displayed by the debugging system 32 for the "Other Lock 1" metadata subtopic of the submenu 42 and for the "IO Operations" and "Device Tree" metadata topics of the main menu 40.

Figure 5:
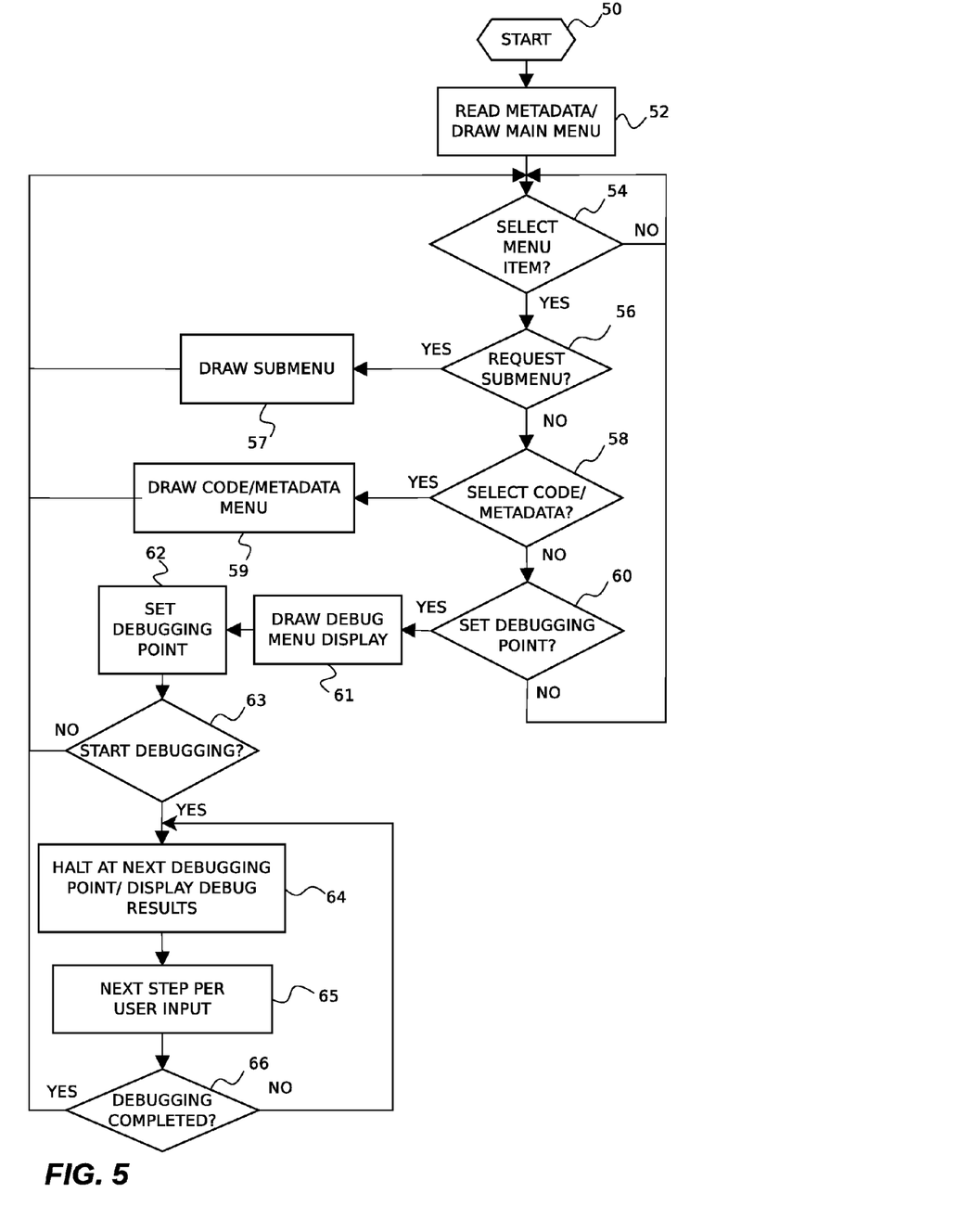
FIG. 5 is a flow diagram showing exemplary logic for implementing the graphical display window and software debugging using annotation metadata.

Turning now to FIG. 5, exemplary logic underlying the menu tree of FIG. 4 is illustrated. Processing begins in block 50 upon invocation of the debugging system 32. In block 52, the debugging system 32 consults the metadata maintained by the metadata management system 34 to determine the contents of, and generate, the main menu 40. In block 54, the debugging system 32 waits for the developer to select a menu item in the currently displayed menu. Once a selection has been made, block 56 determines whether the developer has requested a submenu (e.g., menu 42 of FIG. 4) containing metadata subtopics. If true, the debugging system 32 generates an appropriate submenu in block 57 and returns to block 54 to await user input. If the result of block 56 is false, the debugging system 32 determines in block 58 whether the developer has requested the display of a source code/metadata display menu (e.g., menus 44 or 46 of FIG. 4). If true, the debugging system 32 generates the appropriate menu in block 59 and returns to block 54 to await user input. If the result of block 58 is false, the debugging system 32 determines in block 60 whether the developer has opted to set a debugging point. If false, processing returns to block 54 to await user input. If true, the debugging system 32 creates the debugging menu 48 in block 61. A debugging point is set in block 62 in response to user input in the debugging menu 48. If the developer utilized metadata menus or submenus (e.g. 40 or 42 of FIG. 4) to set the debugging point, the debugging system 32 determines the location of the debugging point within the target software 38 by consulting the metadata management system to identify the source code associated with the selected metadata topic or subtopic. The debugging system 32 then determines in block 63 whether a request has been made to start the debugging process. If false, the debugging system returns to block 54 to await further user input. If the result of block 63 is true, the debugging system 32 commences debugging, halts at the specified debugging point, and generates debugging display results in block 64. The debugging system 32 then steps through the target software 38 in block 65 according to next step input provided by the developer in the debugging display menu 49. If the next step is based on specified metadata topic or subtopic, the debugging system 32 will consult the metadata management system 34 to identify the associated source code, and execute that code. If the next step represents the next line of source code, the debugging system 32 will simply execute that code in the manner of a conventional single-stepping debugger. In block 66 the debugging system 32 tests whether debugging has completed. If false, debugging continues at block 64. If true, processing returns to block 54 to await user input.

Exemplary Metadata Management System

In order to support metadata-integrated debugging operations, the metadata management system 34 maintains associations between source code data and metadata that establish data/metadata relationships at several hierarchical levels. The menus of FIG. 4 represent an example of such a metadata hierarchy. Additional associations may be established between portions of the metadata itself. These metadata/metadata relationships can be used to organize the metadata into metadata hierarchies and categories. This is also shown by the menus of FIG. 4. The data/metadata and metadata/metadata relationships can be one-to-one, one-to-many and many-to-many, in any combination.

With respect to data/metadata relationships, metadata may be associated with one or more user-defined ranges and nested sub-ranges of source code, such as an entire software product, components or modules thereof, blocks of code, lines of code, byte ranges, files or functions, etc. Conversely, a particular item of source code could be associated with multiple metadata items, such as a set of metadata containing increasing depth of detail for the source code item. These data/metadata relationships may be statically defined and/or dynamically defined using regular expressions or other patterns that are parsed as the metadata is searched or displayed in the menus of FIG. 4. The latter technique allows a single unit of metadata to easily relate to multiple pieces of source code, and defers instantiation of the precise data/metadata relationship until metadata menu search/display time instead of at metadata creation time. Moreover, whereas a statically defined data/metadata relationship could break if the underlying source code changes, a dynamically defined data/metadata relationship will continue to be valid so long as the regular expression that defines it matches one or more source code elements.

With respect to metadata/metadata relationships, complex multidimensional associations may be established that allow many different pathways to be navigated through metadata hierarchies that are completely user-definable. These search pathways may intersect at metadata intersections that belong to more than one search domain. For example, a particular unit of metadata (e.g. a piece of metadata describing as specified software data structure) may lie in a first search domain that includes all data structures, a second search domain that includes all source code that is considered complex, and a third search domain that includes all source code maintained by a particular software group. Multiple metadata search domains may thus be created that allow the metadata (and the underlying source code) to be viewed from different aspects according to the interests and needs of the metadata consumer.

The metadata may be represented in any suitable fashion, including as a set of structures, objects or other units (metadata containers). Each such metadata container may include one or more context discriminant(s) that establish the data/metadata relationship(s) to which the metadata container belongs, one or more pieces of category or hierarchy information that establish the metadata/metadata relationships to which the metadata container belongs, and descriptive information that represents the metadata itself. This descriptive information can be stored in any desired fashion, including as a BLOB (Binary Large Object) pointed to by the metadata container. The information may be encoded in any desired information format, including plain text, an XML document, a bitmap, rich text, animation, a flow chart, pseudocode, a state diagram, etc.).

The metadata category/hierarchy information is used to view source code annotations at different elevations, as exemplified by the menu tree of FIG. 4. Source code subject matter for which this type of metadata organization is advantageous include call graph hierarchies, files/directories, lock hierarchies and depth of descriptive detail. The latter could be used when multiple pieces of metadata are associated with a block of source code and are assigned a relative descriptiveness in order to allow summary vs. detail differentiation in the annotation. There can be any number of hierarchy levels. Metadata containers in a given hierarchy may be located by following the hierarchy. The metadata category represents the metadata hierarchy level at which information is being provided by a given metadata container. By way of example, categories to which metadata containers could be assigned might be locks, semaphores, Read-Copy Update (RCU), Virtual File System (VFS) acquire/release, sets of variables, users of specific functions, or code belonging to different subsystems or drivers.

Figure 6:
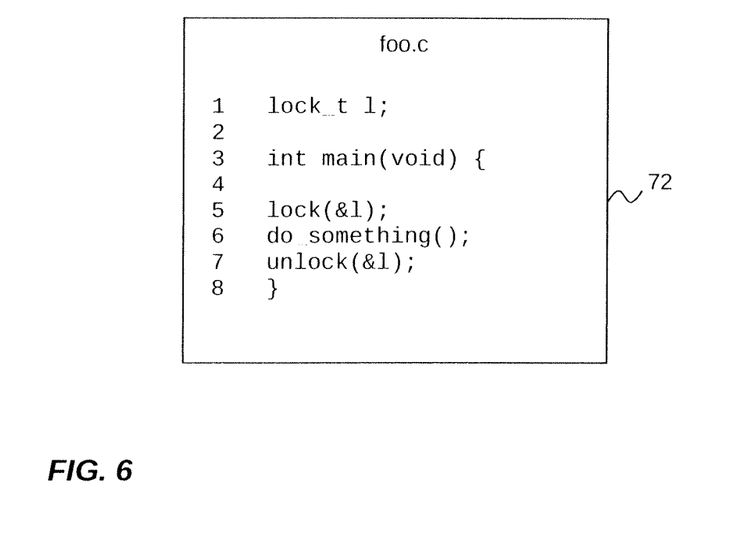
FIG. 6 is a diagrammatic representation of an exemplary source code file.
Figure 7:
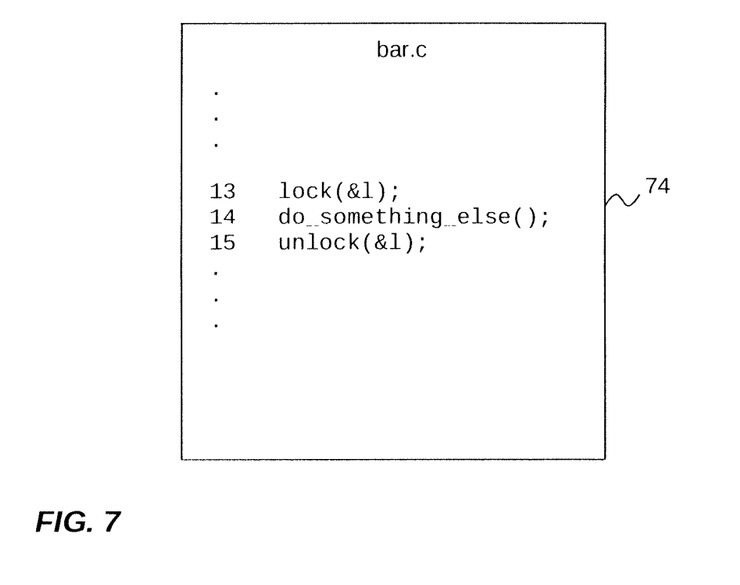
FIG. 7 is a diagrammatic representation of another exemplary source code file.

FIG. 6 illustrates an exemplary source code file 70 named "foo.c" Line 1 of the source code file 2 declares a lock variable "1" that represents the "Global L Lock" of FIG. 4. This is the same source code shown in submenu 44 of FIG. 4. Lines 5-7 of the source code file 72 represent a critical section that is protected by this lock. This source code is shown in submenu 46 of FIG. 4. FIG. 7 illustrates another exemplary source code file 74 named "bar.c." Lines 13-15 of the source code file 74 represent another critical section that is protected by the "Global L Lock." This source code is also shown in submenu 46 of FIG. 4.

Figure 8:
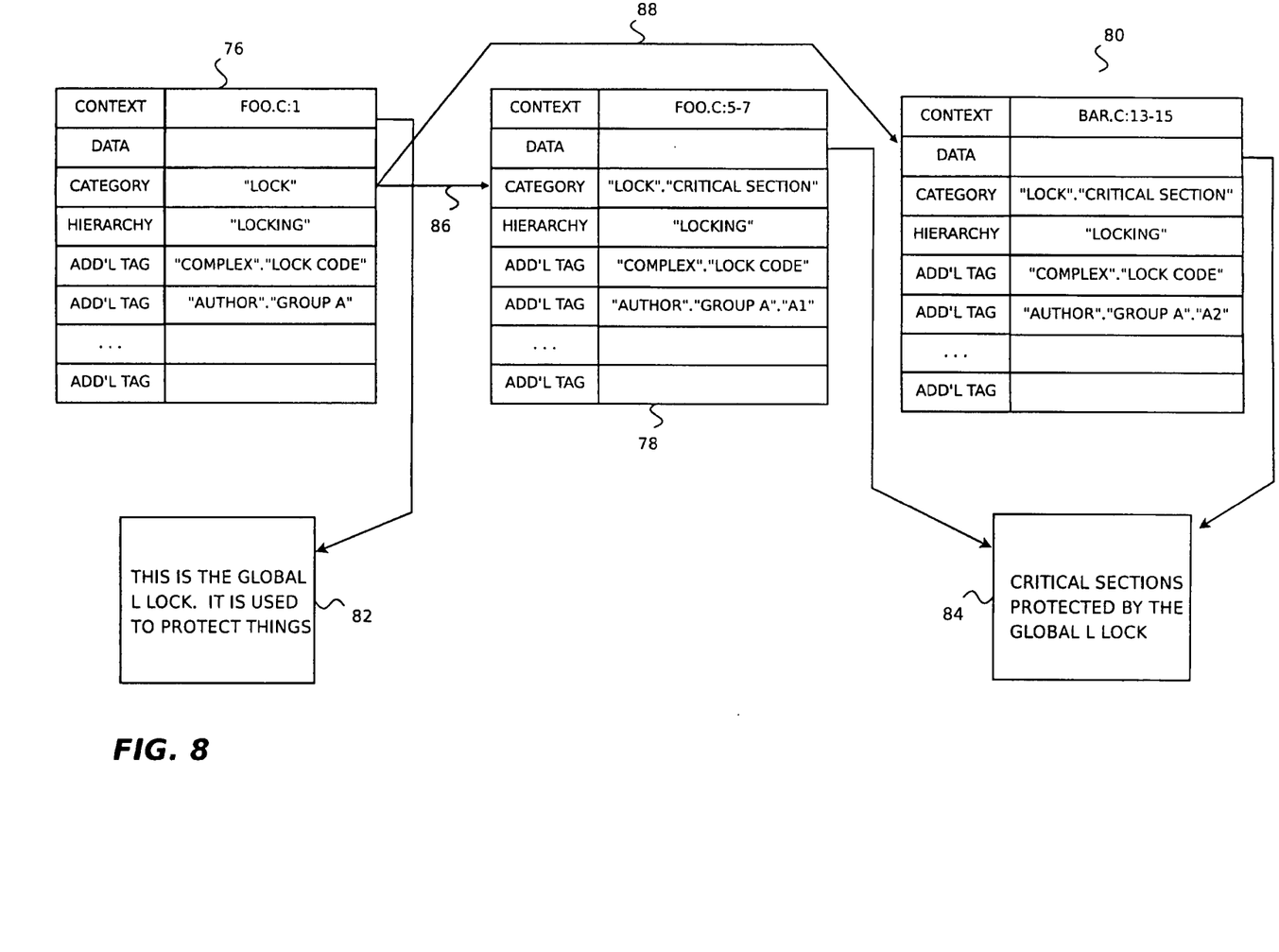
FIG. 8 is a diagrammatic representation of a set of exemplary metadata containers.

FIG. 8 illustrates a hierarchy of exemplary metadata containers 76, 78 and 80 that manage the metadata associated with the source code files 72 and 74. Each metadata container 76, 78 and 80 has several field/value combinations, namely, a fully user-definable context discriminant (e.g., byte ranges, code blocks, lines of code, functions, files, or regular expressions matching any of the foregoing), user-created descriptive information (metadata) related to the data, user-defined hierarchy/category tags, and optional user-created additional field/value pairs of an arbitrary nature.

In the metadata container 76, the context discriminant field labeled "Context" identifies one context discriminant, namely line one of the foo.c source code file 72. This creates a one-to-one data/metadata relationship between the metadata container 76 and line 1 of the foo.c file. Specifying a context discriminant in the foregoing manner represents a static definition of a data/metadata relationship. As described above, such relationships may also be dynamically defined using regular expressions. For example, instead of the context discriminant of the metadata container 76 specifying the file and line number of the "Global L Lock," a regular expression that matches any location in the source code where the "Global L Lock" is defined may be declared. Thus, if the foo.c source code file 72 was edited so that the "Global L Lock" declaration was now on a different line, the dynamically defined context discriminant would still be valid. Moreover, if for some reason the "Global L Lock" was declared more than once, the dynamically defined context discriminant would evaluate to all such occurrences in the source code.

The descriptive information field labeled "Data" specifies the name or location (e.g., using a file name or a pointer) of a storage entity 82, such as a BLOB, that contains the actual metadata. In this example, the metadata in the storage entity 82 comprises text that informs the reader that line 1 of the foo.c source code file 72 is the "Global L Lock", and provides descriptive information about this lock. As previously stated, the metadata could take any form, including but not limited to plain text, an XML document, a bitmap, rich text, animation, a flow chart, pseudocode, a state diagram, etc.).

The field labeled "Category" specifies that the metadata for the metadata container 76 is in the "Lock" category. The category field provides a convenient label that can be used to represent the metadata container 76 for the search and display of metadata information by the debugging system 32 (as in FIG. 4). It also represents an extension of the hierarchy field described below, allowing the metadata container 76 to represent a particular metadata category within a selected metadata hierarchy level.

The field labeled "Hierarchy" specifies that the metadata for the metadata container 76 is in the "Locking" Hierarchy. The hierarchy field represents one metadata/metadata relationship pathway (search domain) that allows metadata containers to be traversed during metadata-integrated debugging (as in FIG. 4). In particular, the pathway defined by the hierarchy fields of a set of metadata containers will usually represent a typical top-down hierarchy extending from top level metadata of a very general nature to low level metadata of a very detailed nature. As such, the hierarchy fields of a set of metadata containers will usually define a typical tree hierarchy of the type shown in FIG. 4. To facilitate metadata organization and searching by the debugging system 32, the hierarchy field value may be set forth as a full hierarchical path listing, similar to a file system directory path specification. This is illustrated in the custom tag fields described in the next paragraph, which use a "dot" notation to separate hierarchy levels. The reason this notation is not apparent in the "Locking" hierarchy field of the metadata container 76 is because the "Locking" hierarchy represents a top level metadata topic.

The remaining field/value pairs labeled "Add'l Tag" are custom tag fields that are intended to be optionally filled in with information to create additional dimensions of metadata/metadata relationship, thereby establishing new metadata search domains that can be presented by the debugging system 32 to the developer. For example, in FIG. 8, a metadata administrator has added a custom tag to the metadata container 76 stating that the "Global L Lock" represents "Lock Code" in a "Complex" code category. The custom tag uses the above-mentioned "dot" notation to specify a full hierarchical path listing that pinpoints the location of the metadata container 76 within this custom search domain. The first value of the custom tag (i.e., "Complex") specifies the top level name of the domain. As its name implies, this domain pertains to all source code that is considered to be complex and provides an additional navigational pathway that facilitates the search and display of metadata for such source code by the debugging system 32. By way of example, this would allow a "Complex Code" metadata topic to be added to the main menu 40 of FIG. 4, thereby allowing a developer to find and debug complex code paths. "The "Lock Code" value following the "Complex" field indicates that the "Global L Lock" code whose metadata is provided by the container 76 is a subset of the code considered to be complex. Note that hierarchy path formats other than "dot" notation could also be used. Alternatively, instead of hierarchy path listings, metadata containers in a given hierarchical path could be linked together (e.g., using pointer entities) to establish the path relationships. A further custom tag of the metadata container 76 specifies that this container belongs to a top level search domain known as "Author" and is in a subset group of authors known as "Group A." This domain associates source code with particular software development teams. The custom tag indicates that software group A maintains the "Global L Lock" code. Again, the debugging system 32 could use this custom tag to create an "Author" metadata topic in the main menu 40 of FIG. 4, thereby allowing a developer to find and debug source code written by certain software authors.

The metadata container 78 is used for metadata pertaining to the critical section code of lines 5-7 of the foo.c source code file 72. Similarly, the metadata container 80 is used for metadata pertaining to the critical section code 13-15 of the bar.c source code file 74. The foregoing is indicated by the respective context fields of the metadata container 78 and 80. The data fields of the metadata containers 78 and 80 specify the name or location of a common storage entity 84, such as a BLOB, that contains the actual metadata for both metadata containers. Separate storage entities would be used if the metadata was different for each metadata container. In this example, the metadata informs the developer that lines 5-7 of the foo.c source code file 72 and lines 13-15 of the bar.c source code file 74 represent critical sections that are protected by the "Global L Lock". The category field of the metadata containers 78 and 80 specifies that the metadata for both metadata containers is in a "Critical Section" subcategory of the "Lock" category (used for metadata container 76). This is indicated by the use of a "dot" notation that provides a precedence indicator specifying category precedence. The effect of this category precedence is visible in FIG. 4, wherein submenu 42 displays a "Critical Section" metadata subtopic as an entity that uses the "Global L Lock."

The hierarchy field of the metadata containers 78 and 80 specifies that the metadata for both metadata containers is in the "Locking" Hierarchy. The first custom tag field of the metadata containers 78 and 80 is empty because the associated source code is not considered to be complex. The second custom tag field of the metadata container 78 specifies that the source code associated with this container is maintained by section "A1" of software development "Group A." The second custom tag field of the metadata container 80 specifies that the source code associated with this container is maintained by section "A2" of software development "Group A."

The arrows labeled 86 and 88 in FIG. 8 illustrate how the category fields of the metadata containers 76, 78 and 80 provide the ability to extend the hierarchical fields. In particular, the arrows labeled 86 and 88 respectively show that the metadata containers 78 and 80 are related to the metadata container 76 because all are part of the "Locking" hierarchy. However, the metadata container 76 is in the higher precedence "Lock" category whereas the metadata containers 78 and 80 are in the lower precedence "Critical Section" subcategory of the "Lock" category. When a metadata search performed by the debugging system 32 reaches the metadata container 76 and the "Global L Lock" metadata is encountered, it will be a simple matter using the hierarchy/category information to reach the metadata containers 78 and 80 to determine the critical sections that are protected by this lock.

Figure 9:
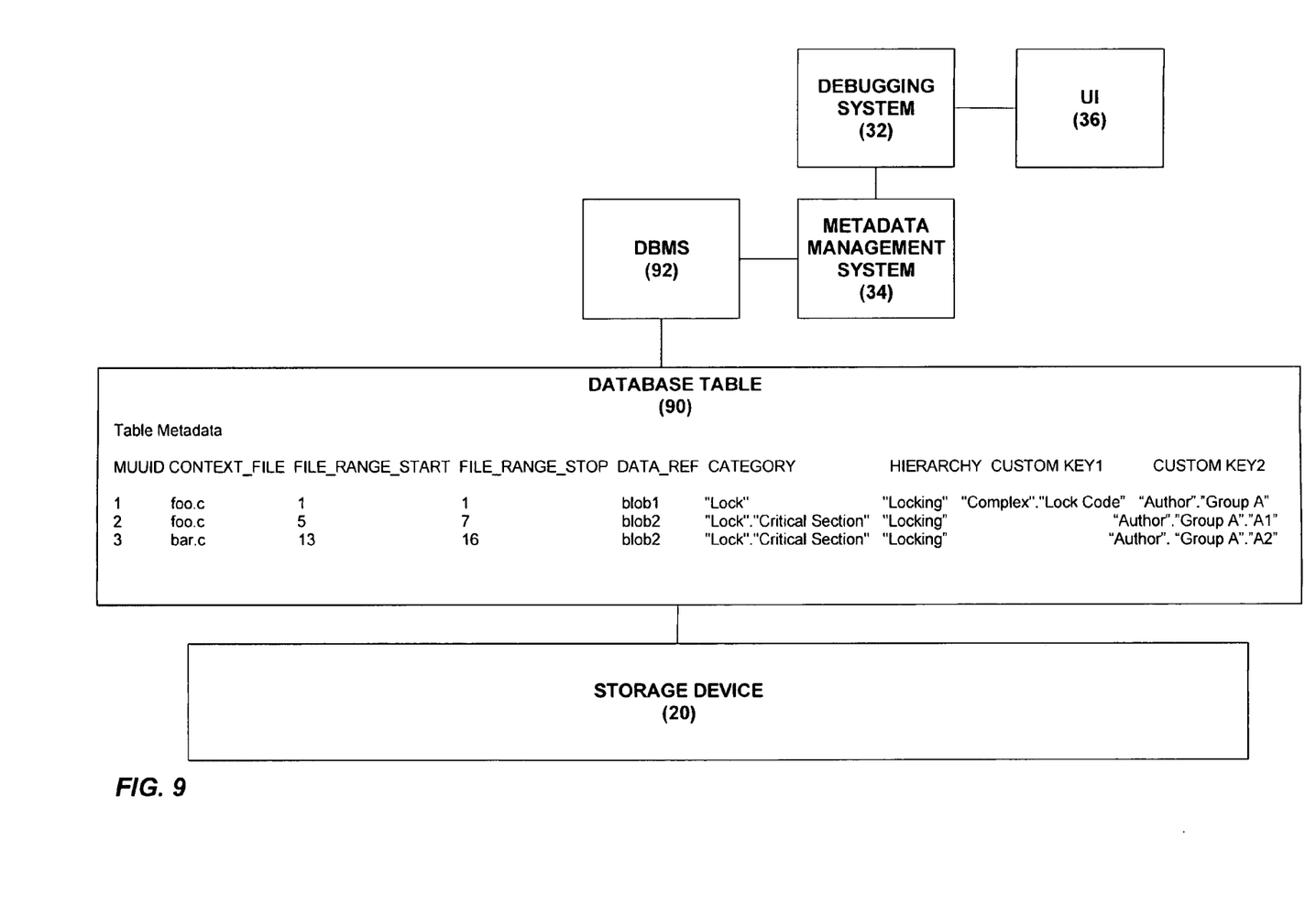
FIG. 9 is a block diagram showing an exemplary metadata management system and an associated database system and database table for storing metadata containers.

Turning now to FIG. 9, an exemplary technique is shown for storing the metadata containers 76, 78 and 80 using a database table 90 managed by a database management system 92. The database table 90 is part of a database that may reside on the storage device 20 of FIG. 2. Alternatively, the database could reside on a remote system that communicates with the system 2 of FIG. 1. The database management system 92 may operate as a back end system on behalf of the metadata management system 34, which in turn is accessed by the debugging system 32 in response to user input via the user interface 36 (FIG. 3). Functions that are provided by the metadata management system 34 may include allowing a metadata administrator to (1) create metadata containers, (2) create data/metadata relationships by associating metadata to source code (e.g., by specifying the context determinants of metadata containers), and (3) create metadata/metadata relationships by assigning the metadata containers to hierarchies and categories. Another function of the metadata management system 34 is to provide an interface to the debugging system 32 so that the latter can conduct searches of the metadata and source code. If desired, the source code may be stored with the metadata on the storage device 20, or it may be stored separately on a different data storage resource (not shown). Exemplary implementations of the foregoing functions of the metadata management system 34 are described in more detail below.

The three database rows labeled "1," "2" and "3" of the table 20 respectively represent the metadata containers 76, 78 and 80. The left-most column of table 90 labeled "MUID" is a row identifier index that assigns an index number to each metadata container. To the right of this index, the remaining columns of the table 90 represent the field/value pairs of the metadata containers 76, 78 and 80. Each of these columns can be used as a search key for locating metadata. For the context field of FIG. 8, the file name, file range start and file range end values are specified. Alternatively, as described above, a regular expression could be specified in order to create a dynamic context discriminant. For the data field of FIG. 8, the names "Blob1" and "Blob2" are listed to respectively identify the metadata storage entities 82 and 84 of FIG. 8. The next two columns in the table 90 contain the values of the category and hierarchy fields of FIG. 8. The remaining columns correspond to the custom tag fields of FIG. 8. These fields are used as index keys for the custom search domains as described above. The database management system (DBMS) 92 may be implemented using any conventional software that supports database maintenance and searching. It should also be understood that other storage formats may be used to maintain the metadata containers 76, 78 and 80. For example, these metadata containers could be implemented as XML documents that can be searched by the debugging system 32 using conventional XML query techniques. If desired, the XML documents could themselves be stored in an XML document database.

Figure 10:
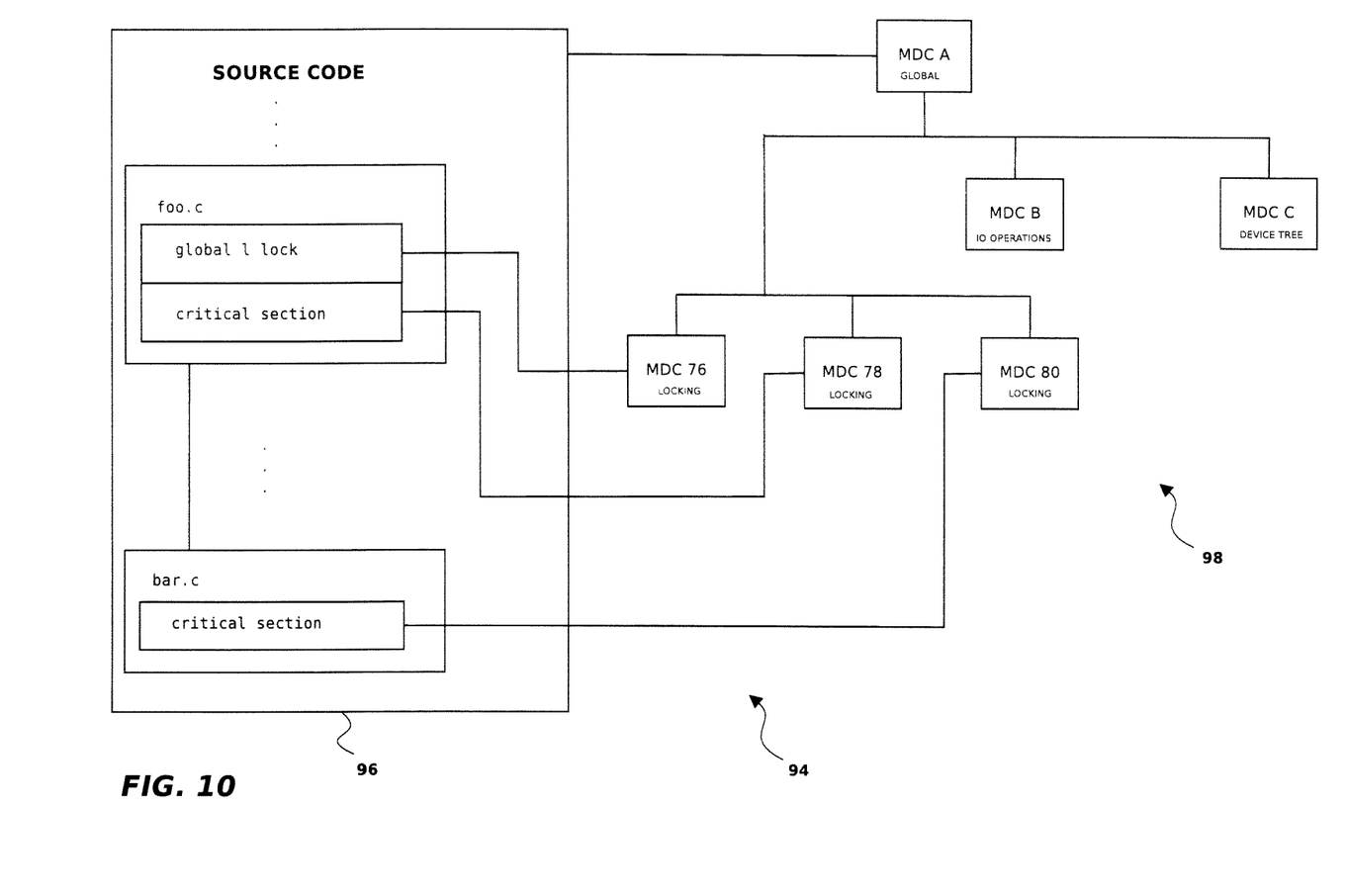
FIG. 10 is a block diagram showing an exemplary metadata/source code infrastructure.

Turning now to FIG. 10, a representative metadata/source code infrastructure 94 is shown that illustrates some of the exemplary associations among metadata containers and source code that have been described above. On the left-hand side of FIG. 10 is a body of source code 96 containing the "Global L Lock" and the critical section code shown in FIGS. 6 and 7. On the right-hand side of FIG. 10 is a set of exemplary metadata containers (MDC) 98 that represent metadata annotation information for the source code 96. These include the metadata containers 76, 78 and 80 (MDC 76, MDC 78 and MDC 80). Each of the metadata containers 98 is shown to be associated with some portion of the source code 96, thereby establishing a set of exemplary data/metadata relationships. The metadata containers 98 are also associated with each other to establish a set of exemplary metadata/metadata relationships. The root node could be a global metadata container (MDC A) that is associated with the entire body of source code 96 and which provides top level information about the product. The second tier of nodes includes metadata containers (MDC B and MDC C) that respectively contain information about "IO Operations" and "Device Tree." These metadata topics are listed in menu 40 of FIG. 4. The second tier of nodes also contains the metadata containers 76, 78 and 80 (MDC 76, MDC 78 and MDC 80) of FIG. 8. MDC 76 is shown to be associated with the "Global L Lock" variable declaration in the foo.c source code file 72. Similarly, MDC 78 is associated with the critical section of foo.c and MDC 80 is associated with the critical section of the bar.c source code file 74.

It will be appreciated that any number of additional data/metadata and metadata/metadata relationships may be established in the metadata/source code infrastructure 94. In this way, the debugging system 32 may follow many different pathways through the metadata (and source code) space, allowing it to present debugging information in the user interface 36. A developer may thus traverse the metadata information and set debugging points at a desired level of detail. If the developer is not satisfied with this level of detail they can manipulate the user interface 36 to pull back to a higher level scope or drill down through the metadata layers to a lower level scope containing greater detail.

Figure 11:
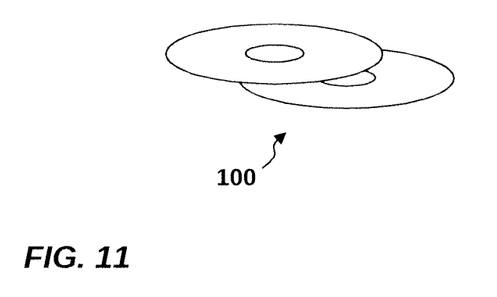
FIG. 11 is a diagrammatic representation of exemplary storage media that may be used in a computer program product providing software and/or firmware logic for implementing annotated file display.

Accordingly, a technique has been disclosed for performing metadata-integrated debugging. It will be appreciated that the foregoing concepts may be variously embodied in any of a data processing system, a machine implemented method, and a computer program product in which programming logic is provided by one or more machine-useable storage media for use in controlling a data processing system to perform the required functions. Relative to a computer program product having machine-readable storage media and programming logic, exemplary data storage media for storing the programming logic are shown by reference numeral 100 in FIG. 11. The data storage media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such data storage media can store the programming logic of the debugging system 32, the metadata management system 34, and optionally one or more of the other components of FIG. 9, including the database management system 92, either alone or in conjunction with another software product that incorporates the required functionality. The programming logic could also be provided by other portable data storage media (such as floppy disks, flash memory sticks, etc.), or data storage media combined with drive systems (e.g. disk drives), or media incorporated in data processing platforms, such as random access memory (RAM), read-only memory (ROM) or other semiconductor or solid state memory. More broadly, the data storage media could comprise any electronic, magnetic, optical, infrared, semiconductor system or apparatus or device or medium (such as a network), or other entity that can contain, store, communicate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for software debugging using annotation metadata, comprising:
   maintaining a set of metadata comprising metadata topics that describes operational features of source code components of a software program by storing the set of metadata in a metadata container stored separately from the source code;
   maintaining data/metadata relationships by storing one or more context discriminants in the metadata container that describes said data/metadata relationships between individual metadata topics and individual units of said source code;
   displaying one or more metadata topics for user selection;
   setting one or more software debugging points in said software program in response to user selection of one or more metadata topics, said setting comprising using one or more context discriminants associated with the selected one or more metadata topics to identify one or more locations in said source code where said one or more debugging points should be set, said one or more debugging points not being present in said software program prior to said setting; and
   performing a debugging action when execution of said software program reaches said debugging points.

2. A method in accordance with claim 1, wherein said data/metadata relationships include statically defined data/metadata relationships and dynamically defined data/metadata relationships based on regular expressions or other pattern matching criteria.

3. A method in accordance with claim 1, wherein said debugging action comprises executing all software instructions having a data/metadata relationship with said selected one or more metadata topics and displaying a debugging output.

4. A method in accordance with claim 3, wherein said software instructions represent one or more units of said source code having a data/metadata relationship with metadata that has a metadata/metadata relationship with said selected one or more metadata topics.

5. A method in accordance with claim 1, wherein said metadata is displayed hierarchically.

6. A method in accordance with claim 1, further including displaying source code having a data/metadata relationship with said selected one or more metadata topics and setting said one or more debugging points in response to user selection of one or more locations in said source code in addition to setting said one or more debugging points in response to user selection of said selected one or more metadata topics.

7. A data processing system for software debugging using annotation metadata, comprising:
   a processor;
   a memory coupled to said processor, the memory comprising a non-transitory computer usable medium tangibly embodying at least one program of instructions executable by a computer to perform operations comprising:
   maintaining a set of metadata comprising metadata topics that describes operational features of source code components of a software program by storing the set of metadata in a metadata container stored separately from the source code;
   maintaining data/metadata relationships by storing one or more context discriminants in the metadata container that describes said data/metadata relationships between individual metadata topics and individual units of said source code;
   displaying one or more metadata topics for user selection;
   setting one or more software debugging points in said software program in response to user selection of one or more metadata topics, said setting comprising using one or more context discriminants associated with the selected one or more metadata topics to identify one or more locations in said source code where said one or more debugging points should be set, said one or more debugging points not being present in said software program prior to said setting; and
   performing a debugging action when execution of said software program reaches said debugging points.

8. A system in accordance with claim 7, wherein said data/metadata relationships include statically defined data/metadata relationships and dynamically defined data/metadata relationships based on regular expressions or other pattern matching criteria.

9. A system in accordance with claim 7, wherein said debugging action comprises executing all software instructions having a data/metadata relationship with said selected one or more metadata topics and displaying a debugging output.

10. A system in accordance with claim 9, wherein said software instructions represent one or more units of said source code having a data/metadata relationship with metadata that has a metadata/metadata relationship with said selected one or more metadata topics.

11. A system in accordance with claim 7, wherein said metadata topics are displayed hierarchically.

12. A system in accordance with claim 7, wherein said least one program of instructions is executable by a computer to perform operations that further comprise displaying source code having a data/metadata relationship with said selected one or more metadata topics and setting said one or more debugging points in response to user selection of one or more locations in said source code in addition to of setting said one or more debugging points in response to user selection of said selected one or more metadata topics.

13. A computer program product, comprising:
   one or more non-transitory computer useable storage media;
   program logic recorded on said computer useable media for programming a data processing platform to perform software debugging using annotation metadata, as by:
   maintaining a set of metadata comprising metadata topics that describes operational features of source code components of a software program by storing the set of metadata in a metadata container stored separately from the source code;
   maintaining data/metadata relationships by storing one or more context discriminants in the metadata container that describes said data/metadata relationships between individual metadata topics and individual units of said source code;

displaying one or more metadata topics for user selection;

setting one or more software debugging points in said software program in response to ser selection of one or more metadata topics, said setting comprising using one or more context discriminants associated with the selected one or more metadata topics to identify one or more locations in said source code where said one or more debugging points should be set, said one or more debugging points not being present in said software program prior to said setting; and performing a debugging action when execution of said software program reaches said debugging points.

14. A computer program product in accordance with claim 13, wherein said data/metadata relationships include statically defined data/metadata relationships and dynamically defined data/metadata relationships based on regular expressions or other pattern matching criteria.

15. A computer program product in accordance with claim 13, wherein said debugging action comprises executing all software instructions having a data/metadata relationship with said selected one or more metadata topics and displaying a debugging output.

16. A computer program product in accordance with claim 15, wherein said software instructions represent one or more units of said source code having a data/metadata relationship with metadata that has a metadata/metadata relationship with said selected one or more metadata topics.

17. A computer program product in accordance with claim 13, wherein said metadata is displayed hierarchically.

18. A computer program product in accordance with claim 13, wherein said program logic is further adapted to program a data processing platform to perform software debugging by displaying source code having a data/metadata relationship with said selected one or more metadata topics and setting said one or more debugging points in response to user selection of one or more locations in said source code in addition to setting said one or more debugging points in response to user selection of said selected one or more metadata topics.

19. A method for software debugging using annotation metadata, comprising:

maintaining a set of metadata comprising metadata topics that describes operational features of source code components of a software program by storing the metadata in a metadata container stored separately from the source code;

maintaining data/metadata relationships by storing one or more context discriminants in the metadata container that describes said data/metadata relationships between individual metadata topics and individual units of said source code;

displaying one or more metadata topics for user selection;

setting one or more software debugging points in said software program that is (are) associated with one or more metadata topics, selected by way of a first user input in said user interface, said setting comprising using one or more context discriminants associated with the selected one or more metadata topics to identify one or more locations in said source code where said one or more debugging points should be set, said one or more debugging points not being present in said software program prior to said setting; and performing a debugging action when execution of said software program reaches said debugging points in response to a second user input in said user interface.

20. A method in accordance with claim 19 wherein said second user input comprises a selection of one or more metadata topics and said debugging action comprises executing all source code associated with said one or more metadata topics selected by said second user input.

21. A computer program product, comprising:

one or more non-transitory computer useable storage media;

program logic stored on said computer useable media for programming a data processing platform to perform software debugging using annotation metadata, as by:

maintaining a set of metadata comprising metadata topics that describes operational features of said source code components of a software program by storing the metadata in a metadata container stored separately from the source code;

maintaining data/metadata relationships by storing one or more context discriminants in the metadata container that describes said data/metadata relationships between individual metadata topics and individual units of said source code;

displaying one or more metadata topics for user selection;

setting one or more software debugging points in said software program that is associated with one or more metadata topics, said setting comprising using said one or more context discriminants associated with the selected one or more units of said metadata to identify one or more locations in said source code where said one or more debugging points should be set, wherein said metadata selected by way of a first user input in said user interface, said one or more debugging points not being present in said software program prior to said setting; and performing a debugging action when execution of said software program reaches said debugging points in response to a second user input in said user interface.

22. A computer program product in accordance with claim 21 wherein said second user input comprises a selection of one or more metadata topics and said debugging action comprises executing all source code associated with said one or more metadata topics selected by said second user input.

* * * * *